United States Patent
Hyogo et al.

(10) Patent No.: US 7,586,638 B2
(45) Date of Patent: Sep. 8, 2009

(54) PRINT CONTROL APPARATUS AND PRINTING SYSTEM

(75) Inventors: Masaki Hyogo, Suwa (JP); Eiji Ito, Suwa (JP); Tomohiro Kodama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 539 days.

(21) Appl. No.: 11/409,291

(22) Filed: Apr. 21, 2006

(65) Prior Publication Data

US 2006/0238804 A1   Oct. 26, 2006

(30) Foreign Application Priority Data

Apr. 26, 2005   (JP)   .............................. 2005-128446

(51) Int. Cl.
*G06K 15/00*   (2006.01)
(52) U.S. Cl. ...................................... 358/1.16; 358/1.17
(58) Field of Classification Search ................ 358/1.16, 358/1.18, 1.14, 1.15
See application file for complete search history.

(56) References Cited

U.S. PATENT DOCUMENTS

| 5,878,197 | A | * | 3/1999 | Miyahara | .................. 358/1.16 |
| 6,132,117 | A | * | 10/2000 | Fukano et al. | ................. 400/76 |
| 6,678,755 | B1 | * | 1/2004 | Peterson et al. | ................ 710/24 |
| 2002/0114001 | A1 | * | 8/2002 | Oyanagi | ..................... 358/1.15 |
| 2003/0210623 | A1 | * | 11/2003 | Fukuchi | ................... 369/47.31 |
| 2004/0167995 | A1 | | 8/2004 | Fujita et al. | |
| 2005/0160201 | A1 | * | 7/2005 | Jeddeloh | ....................... 710/22 |
| 2006/0209335 | A1 | * | 9/2006 | Sasaki | ........................ 358/1.15 |

FOREIGN PATENT DOCUMENTS

| EP | 0 930 563 A2 | 7/1999 |
| EP | 1 174 789 A2 | 1/2002 |
| JP | 09-288639 | 11/1997 |
| JP | 2003-331521 | 11/2003 |
| JP | 2004-70570 | 3/2004 |

\* cited by examiner

*Primary Examiner*—Mark K Zimmerman
*Assistant Examiner*—Haris Sabah

(57) ABSTRACT

Systems and methods for reliably canceling a DMA transfer mode and accelerating printer initialization. A host device 3 for controlling a printer having a DMA transfer mode for printing by transferring image data associated with a received image print command to a print buffer 15. The host device 3 has a print data generating unit 33 for generating the image print command, memory 35 for storing the data size of the image data associated with the image print command generated by the print data generating unit 33, and a printer control unit 34 for sending to the printer 1 an initialization command having null data of the data size stored in memory 35 added to the beginning of the initialization command.

6 Claims, 5 Drawing Sheets

PRINT CONTROL APPARATUS AND PRINTING SYSTEM

RELATED APPLICATIONS

Japanese patent application No. 2005-128446, is hereby incorporated by reference in its entirety.

BACKGROUND OF THE INVENTION

1. Field of the Invention

The present invention relates to technology for initializing a printer having a DMA transfer mode.

2. Description of the Related Art

Some printers have a DMA transfer mode that is used to transfer image data contained in an image print command from the receive buffer to the print buffer by direct memory access (DMA) when an image print command is received. In the DMA transfer mode, DMA transfer of the received data continues until data equal to the size of the image data contained in the image print command has been transferred.

As a result, if the printer is connected to a host device by a USB cable, for example, and the cable is disconnected while the host device is sending the image print command, the printer remains in the DMA transfer mode waiting for the unsent data. If the host device and printer are then reconnected, the printer must be reinitialized. For the printer to be reinitialized, however, data equal to or greater than the size of the unsent image data in the image print command that was being sent when the connection was interrupted must be sent again in order to terminate the DMA transfer mode.

A conventional printer of this type therefore sends null data of a predetermined fixed size before sending the printer initialization command.

A problem with this arrangement is that the null data that is sent before the initialization command is a fixed size regardless of the data size of the image print command, and may therefore contain too much or too little data. If a large block of null data is sent even though only a small amount of data is needed, for example, time is wasted sending unnecessary data. On the other hand, if a large amount of data is required but the fixed size of the null data is too small, cancelling the DMA transfer mode may not be possible.

OBJECTS OF THE INVENTION

An object of the present invention is therefore to enable reliably cancelling the DMA transfer mode while also accelerating the printer initialization process.

A further object of the invention is to optimize the size of the null data that is sent to the printer for printer initialization.

SUMMARY OF THE INVENTION

To achieve these objects, an apparatus according to a first aspect of the invention is a print control apparatus for controlling a printer having a DMA transfer mode for transferring image data associated with an image print command to a print buffer by direct memory access. The apparatus comprises a command generator for generating an image print command for the printer; memory for storing a data size variable representative of an amount of image data associated with the image print command; and a printer initializer for sending to the printer an amount of null data equal to the data size variable followed by an initialization command.

Preferably, the print control apparatus also has a memory initializer for initializing the memory when termination of the DMA transfer mode is detected. If the memory has been initialized, the printer initializer sends the initialization command without adding null data.

Further preferably, the printer initializer appends a command requesting a response from the printer to the end of the image print command. The memory initializer initializes the memory when a response is received from the printer.

In another aspect of the invention, the printer initializer appends a command requesting a response from the printer to the end of the image print command; and the memory initializer initializes the memory when a response is received from the printer.

A printing system according to another aspect of the invention comprises a printer and a print control apparatus. The printer comprises a print engine, a receive buffer for storing data sent from the print control apparatus, a print buffer for storing print data to be supplied to the print engine, a DMA controller for transferring image data associated with the image print command stored in the receive buffer to the print buffer by DMA (direct memory access), and a command interpreting unit for interpreting print commands stored in the receive buffer and generating and storing print data in the print buffer. The printer operates in the DMA transfer mode for transferring data in a repeating loop based on information denoting the data size of the image data contained in the image print command until the DMA controller completes DMA transfer of data of the specified data size from the receive buffer to the print buffer.

The print control apparatus comprises a transmission means for sending image print commands to the printer, a storage means for storing the data size of the image data associated with the image print command sent by the transmission means, and an initialization means for sending to the printer an initialization command having null data of the data size stored in the storage means added to the beginning of the initialization command.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a printing system according to the present invention is described below with reference to the accompanying figures.

Figure 6:
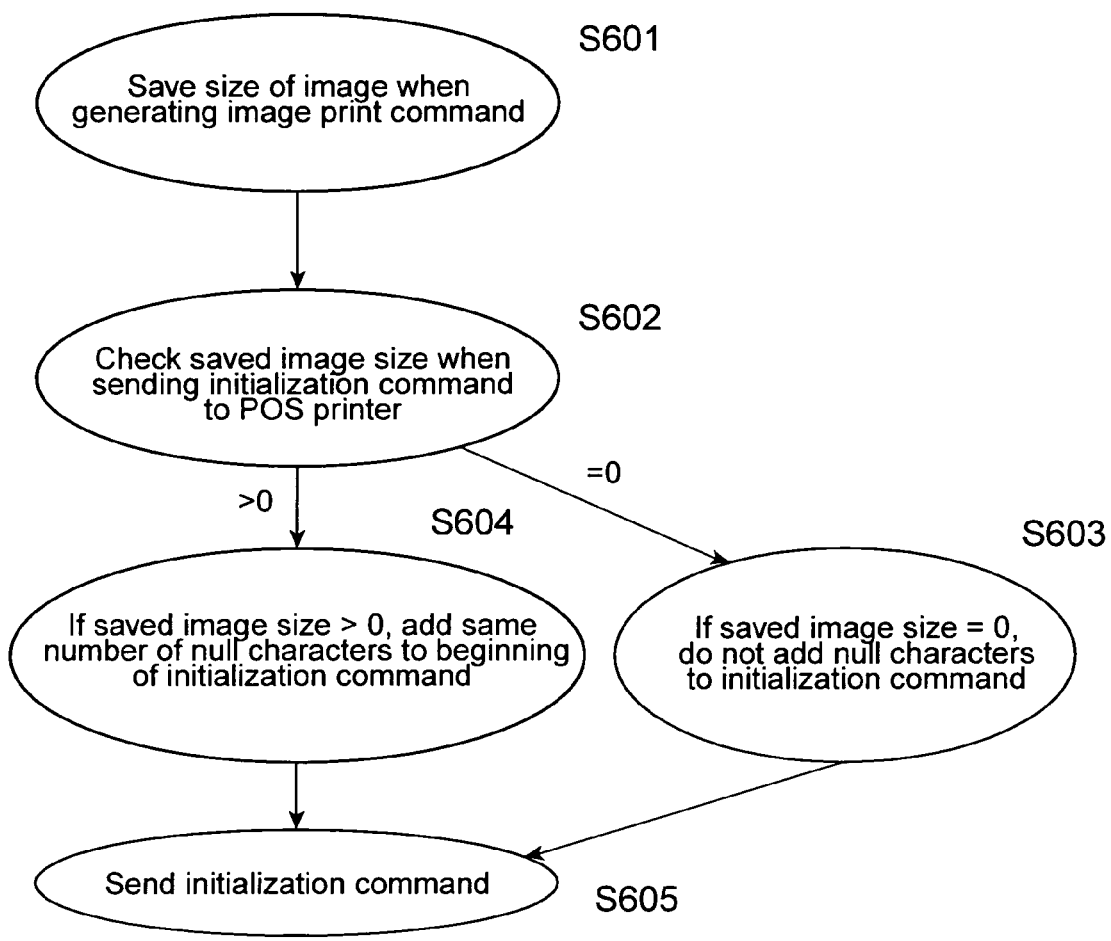
FIG. 6 is a flow chart showing the operating process of the present invention.

FIG. 6 is a flow chart showing the operating process of the present invention.

In step S601, the host device saves the size of the image print command when sending an image print command.

If the size of the image print command was saved (>0) (step S602), the host device adds an empty character string of the same size to the beginning of the initialization command when sending the initialization command to a POS printer (step S604).

If the size of the image print command was not saved (=0) (step S602), the DMA transfer mode is not set and there is no need to add a null string to the initialization command (step S603).

The initialization command is then sent to the printer (S605).

The initialization process can thus be completed quickly because there is no need to add an empty character string to the initialization command when the DMA transfer mode is not set.

Figure 1:
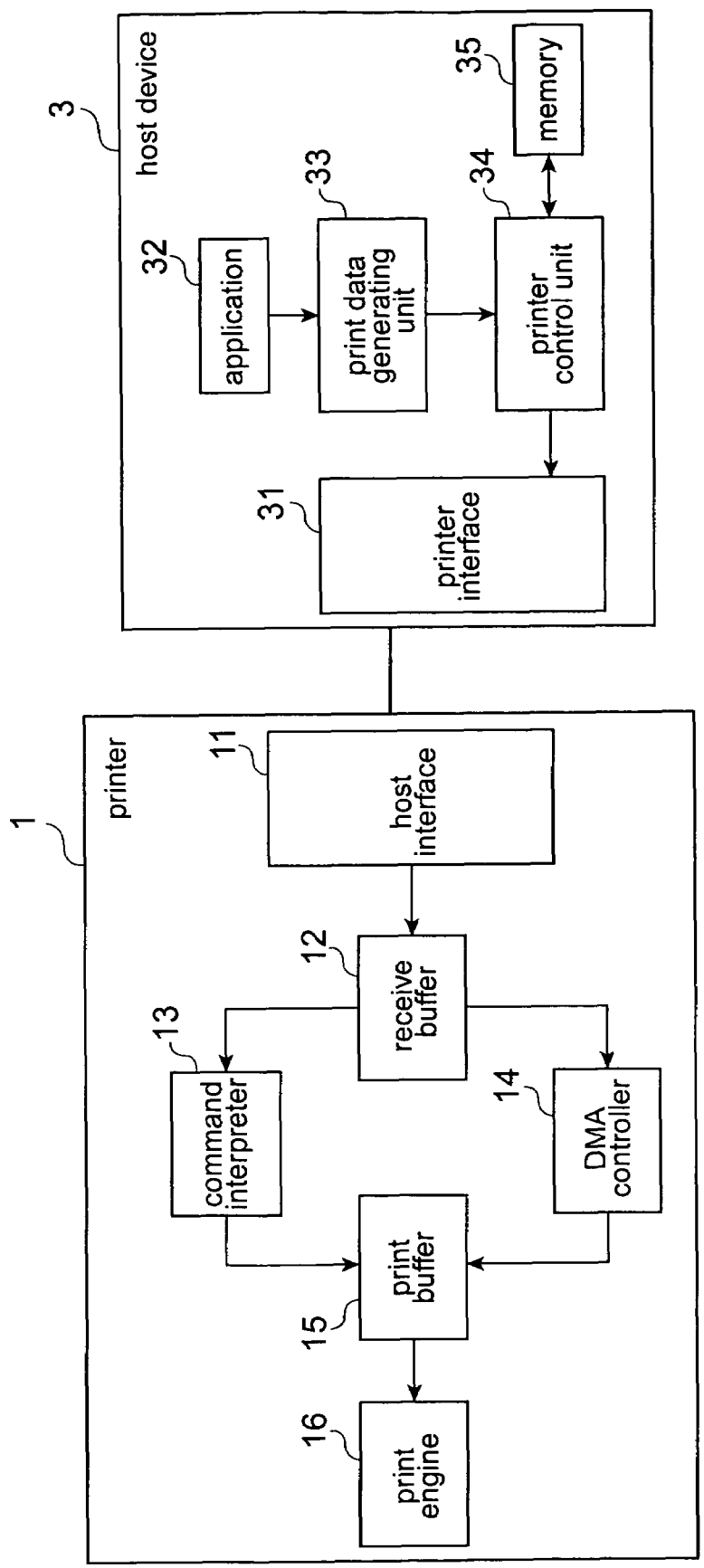
FIG. 1 is a block diagram showing a printing system according to a preferred embodiment of the invention.

FIG. 1 is a block diagram showing the general arrangement of a printing system according to an embodiment of the invention. As shown in FIG. 1, the printing system comprises a printer 1 and a host device 3 as a print control apparatus for controlling the printer 1.

The printer 1 comprises a host interface 11 for receiving print commands and data sent from the host device 3; a receive buffer 12 for temporarily storing data received by the host interface 11; a command interpreter 13 for interpreting the print commands stored in the receive buffer 12 and generating print data; a DMA controller 14 for transferring data stored in the receive buffer 12 to the print buffer 15 by DMA transfer mode without going through the command interpreter 13; a print buffer 15 for accumulating print data; and a print engine 16 for printing based on the print data stored in the print buffer 15.

The printer 1 has the following two modes for transferring data from the receive buffer 12 to the print buffer 15. The first mode is a DMA transfer mode in which the DMA controller 14 moves data from the receive buffer 12 to the print buffer 15 by direct memory access (DMA). The second mode is a normal transfer mode in which the command interpreter 13 interprets and converts print commands accumulated in the receive buffer 12 to bitmap print data, and stores the bitmap print data in the print buffer 15.

The DMA transfer mode is used to transfer image print commands 50 for printing image data (see FIG. 2) to the print buffer 15. When an image print command 50 is stored in the receive buffer 12, the DMA controller 14 transfers the image data 53 from the receive buffer 12 to the print buffer 15 by DMA. The DMA transfer mode ends and the normal transfer mode resumes when the DMA controller 14 has transferred the amount of data denoted in data size 52. The printer 1 thus automatically enters the DMA transfer mode when an image print command 50 is received, and automatically exits the DMA transfer mode when image data 53 of the size declared in data size 52 has been transferred by DMA.

This affords faster image data transfers and thus contributes to faster processing by the printer 1.

The condition for cancelling the DMA transfer mode is that the amount of data declared in data size 52 has been transferred by DMA. Conversely stated, the DMA transfer mode is not cancelled unless the amount of data declared in data size 52 has been transferred. As a result, the printer 1 continues waiting for data in the DMA transfer mode if image data reception is interrupted once the DMA transfer mode has been entered.

The host device 3 is a general purpose computer system, for example, and the functions and elements described below can be implemented by a computer program.

The host device 3 comprises a printer interface 31 enabling two way communication with the printer 1, a plurality of applications 32, a print data generating unit 33 for generating print commands based on instructions from an application 32, a printer control unit 34 for generating commands other than print commands and controlling the printer 1, and memory 35 for storing the data size of the image data contained in the image print command when an image print command is sent to the printer 1.

The print data generating unit 33 functions as a command generator and generates various types of print commands, one of which is an image print command 50 for printing image data.

Figure 2:
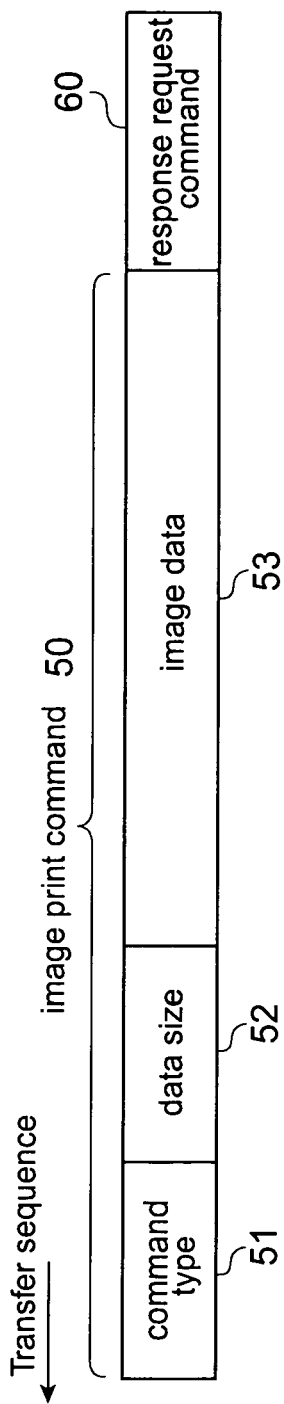
FIG. 2 shows the format of the image print command 50.

FIG. 2 shows the format of the image print command 50. The image print command 50 starts with a command type 51 followed by the data size 52 and image data 53. The command type 51 identifies the command as an image print command 50. The data size 52 declares the size of the image data 53. The image data 53 is the bitmap print data.

The printer control unit 34 stores the data size 52 to memory 35 before sending the image print command 50 generated by the print data generating unit 33 to the printer 1.

When the image print command 50 is sent to the printer 1, the printer control unit 34 may also append a response request command 60 to the end of the image print command 50 as shown in FIG. 2. This response request command 60 can be any command that tells the printer 1 to return a response of some type to the host device 3.

When the printer 1 receives an image print command 50 with an appended response request command 60 and then completes processing the image print command 50, the printer 1 processes the response request command 60 and returns the predetermined response to the host device 3. More specifically, if an image print command 50 with an appended response request command 60 is received, the printer 1 transfers the image data 53 in the DMA transfer mode, exits the DMA transfer mode after the data transfer is completed, and then processes the response request command 60 in the normal transfer mode. As a result, the printer 1 sending a response determined by the response request command 60 to the host device 3 means that the printer 1 has exited the DMA transfer mode.

When the host device 3 receives a response from the printer 1 corresponding to the response request command 60 after sending an image print command 50 with an appended response request command 60 to the printer 1, the printer control unit 34 of the host device 3 functions as a memory initializer and initializes memory 35. The host device 3 thus clears memory 35 when the host device 3 detects that DMA transfer of image data corresponding to the data size stored in memory 35 has ended.

The printer control unit 34 functions as a printer initializer and generates and sends an initialization command to the printer 1 as the printer 1 initialization process. This initialization process is executed when the host device 3 starts up or when the host device 3 detects a printer 1, for example.

Figure 3:
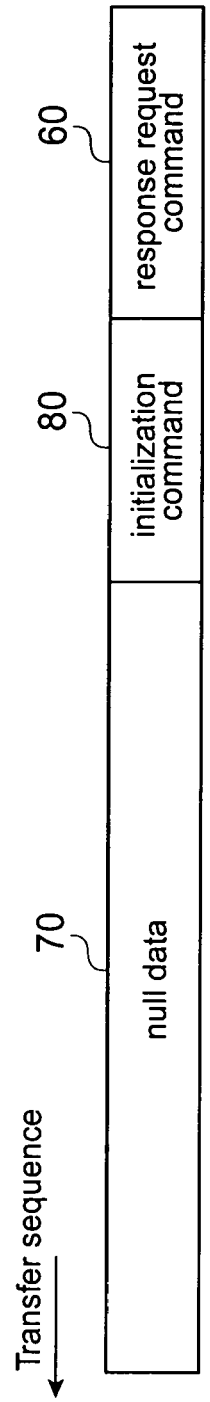
FIG. 3 shows the format of an initialization command sent to the printer.

FIG. 3 shows the format of an initialization command that is sent to the printer 1.

As shown in FIG. 3, the printer control unit 34 inserts null data 70 before the initialization command 80 when sending an initialization command 80 to the printer. The size of this null data 70 is determined by the data size stored in memory 35. A response request command 60 can also be appended to the end of the initialization command 80 in order to know that the initialization process has ended.

If the communication cable is disconnected during an image print data transfer and the printer 1 thus hangs in the DMA transfer mode, the DMA transfer mode can be exited by sending null data 70 equal in size to the image data, and the initialization command can be reliably executed without more data transfer time than is necessary.

If the memory 35 is in the initialized state, that is, if the data size of the image data is not stored in memory 35, the printer control unit 34 sends the initialization command 80 without adding null data 70.

If memory 35 is in the initialized state, the printer 1 is not in the DMA transfer mode and can therefore immediately execute the initialization command upon receipt. It is therefore not necessary to send null data to the printer 1. The null data can thus be omitted when the null data is not required, and the initialization process can therefore be accelerated.

The process of the printing system thus comprised is described next below.

Figure 4:
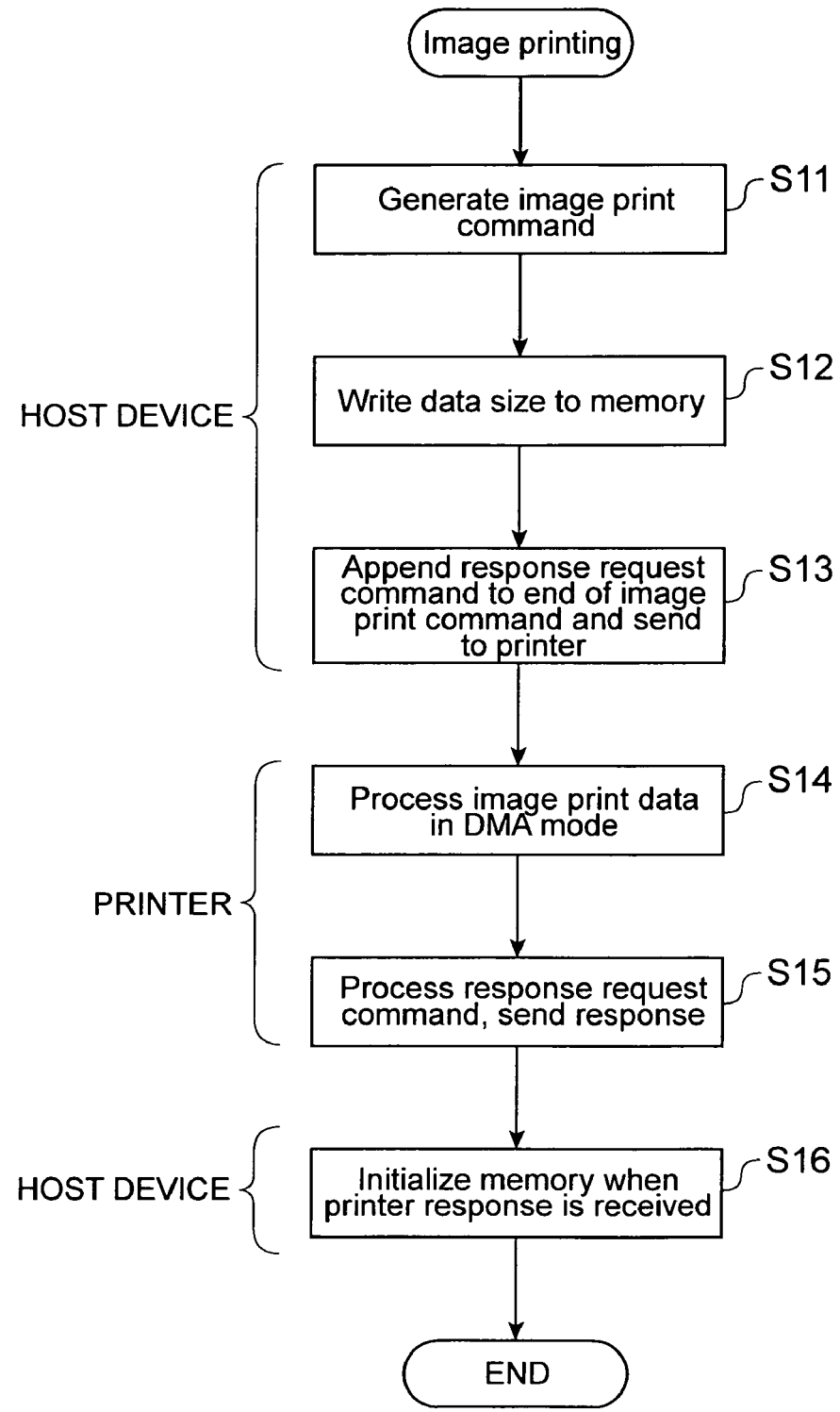
FIG. 4 is a flow chart of the process for printing images.

FIG. 4 is a flow chart of the process for printing images. This process is described below.

Based on instructions from an application 32, the print data generating unit 33 generates an image print command (S11).

The printer control unit 34 then stores the data size of the image data contained in the image print command to memory 35 (S12), appends a response request command 60 to the end of the image print command 50, and sends the image print command 50 with the response request command 60 to the printer 1 (S13).

When the printer 1 receives the image print command 50, the printer 1 processes the image print command in the DMA transfer mode and prints the image data (S14). When processing the image print command 50 ends, the command interpreter 13 processes the response request command 60 and returns the predetermined response to the host device 3 (S15).

When the host device 3 receives a response from the printer 1, the printer control unit 34 initializes the memory 35 and deletes the data size information stored in memory 35 (S16).

Figure 5:
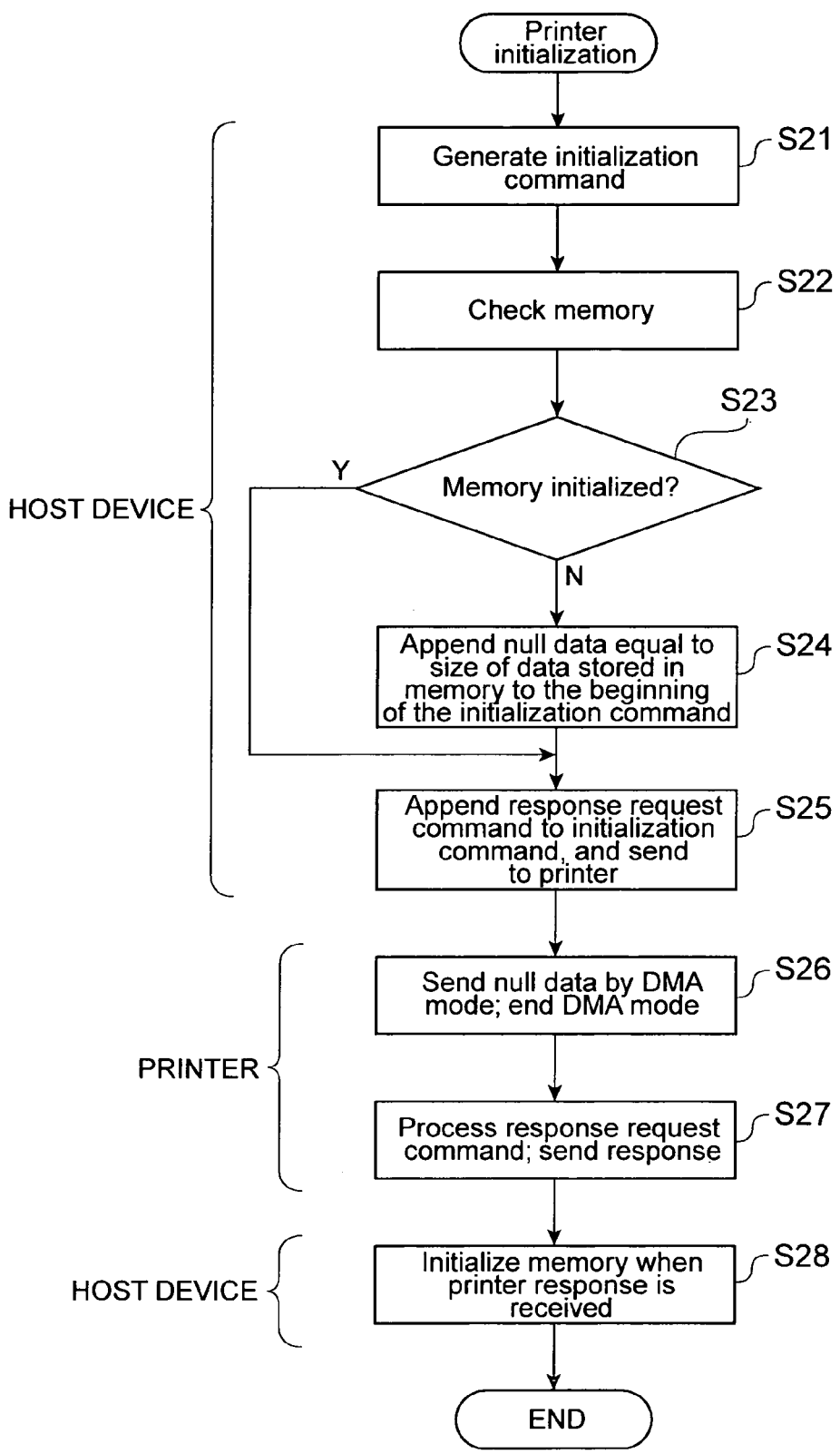
FIG. 5 is a flow chart of the process for initializing the printer.

FIG. 5 is a flow chart of a process for printer initialization. This printer initialization process is described below.

The printer control unit 34 first generates an initialization command 80 (S21). The printer control unit 34 then reads memory 35 to determine if memory 35 is in the initialized state or stores data size information (S22 and S23).

If information denoting the data size is stored in memory 35, null data 70 of the same data size is added to the beginning of the initialization command 80 and sent to the printer 1 (S24). If the memory 35 is in the initialized state, step S24 is skipped and null data is not inserted in front of the initialization command 80.

The printer control unit 34 then appends a response request command 60 to the end of the initialization command 80 and sends the commands to the printer 1 (S25).

If the printer 1 is in the DMA transfer mode, the printer 1 first receives the null data. The DMA controller 14 therefore continues with the DMA transfer of the null data until transferring data of the specified data size is completed, and then exits the DMA transfer mode (S26).

If the printer 1 is not in the DMA transfer mode or exits the DMA transfer mode, the command interpreter 13 executes the initialization command 80 to initialize the printer 1, and then returns a response based on the response request command 60 to the host device 3 (S27).

When the host device 3 receives a response from the printer 1 based on the response request command 60, the printer control unit 34 initializes the memory 35 and thus deletes the data size information from memory 35 (S28).

If the printer requires initialization but the printer is still set to the DMA transfer mode, this arrangement can reliably terminate the DMA transfer mode and cause the printer to execute the initialization command. If the printer is not in the DMA transfer mode, null data is not added to the initialization command, unnecessary traffic is thus eliminated, and the printer can execute the initialization process without delay.

Initializing the memory 35 in step S28 is not limited the timing described above. The memory 35 could be initialized after step S24 or after step S25, for example.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims.

What is claimed is:

1. A print control apparatus for controlling a printer having a DMA transfer mode for transferring image data associated with an image print command to a print buffer by direct memory access, comprising:
   a command generator for generating an image print command for the printer and a data size variable representative of an amount of image data associated with the image print command to be transmitted, wherein the image print command is transmitted via the DMA transfer mode, and the DMA transfer mode cannot be canceled unless the amount of data declared in the data size variable has been transferred;
   memory for storing the data size variable; and
   a printer initializer for sending to the printer an amount of null data equal to the data size variable followed by an initialization command.

2. The apparatus according to claim 1, further comprising a memory initializer for initializing the memory when termination of the DMA transfer mode is detected; and
   the printer initializer sends the initialization command without adding null data when the memory is in the initialized state.

3. The apparatus according to claim 2, wherein a command requesting a response from the printer is appended to the end of the image print command; and
   the memory initializer initializes the memory when a response to the command requesting a response is received from the printer.

4. The apparatus according to claim 2, wherein a command requesting a response from the printer is appended to the end of the initialization command; and
   the memory initializer initializes the memory when a response to the command requesting a response is received from the printer.

5. A method by a general purpose computer system of initializing a printer having a DMA transfer mode for transferring image data associated with an image print command to a print buffer by direct memory access, comprising steps of:
   storing a data size variable representative of an amount of the image data in a memory, wherein image data had been previously transferred via the DMA transfer mode, and the DMA transfer mode cannot be canceled unless the amount of the data declared in the data size variable has been transferred; and
   sending to the printer an initialization command having an amount of null data equal to the data size variable added to the beginning of the initialization command when initializing the printer.

6. An initialization method by a general purpose computer system and for a printer having a DMA transfer mode for transferring image data associated with a received image print command to a print buffer by direct memory access, comprising steps of:
   storing a data size variable representative of the amount of image data in a memory when sending an image print command to the printer from a host device via the DMA transfer mode, and the DMA transfer mode cannot be canceled unless the amount of the data declared in the data size variable has been transferred;

evaluating the data size variable when initializing the printer, and sending an initialization command to the printer without adding null data to the beginning of the initialization command if the data size variable is 0; and evaluating the data size variable when initializing the printer, adding an amount of null data equal to the data size variable to the beginning of the initialization command if the data size variable is greater than 0, and sending the null data and initialization command to the printer.

* * * * *